(12) United States Patent
Tian et al.

(10) Patent No.: US 11,966,552 B2
(45) Date of Patent: Apr. 23, 2024

(54) TOUCH SUBSTRATE, TOUCH SUBSTRATE MANUFACTURING METHOD, TOUCH MODULE AND MANUFACTURING METHOD FOR TOUCH MODULE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Jian Tian, Beijing (CN); Xintao Wu, Beijing (CN); Zouming Xu, Beijing (CN); Chunjian Liu, Beijing (CN); Jie Lei, Beijing (CN); Shaoyi Zhan, Beijing (CN); Jie Wang, Beijing (CN); Jianying Zhang, Beijing (CN); Jiacheng Ding, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,653

(22) PCT Filed: Mar. 4, 2022

(86) PCT No.: PCT/CN2022/079322
§ 371 (c)(1),
(2) Date: Mar. 22, 2023

(87) PCT Pub. No.: WO2022/267539
PCT Pub. Date: Dec. 29, 2022

(65) Prior Publication Data
US 2023/0384900 A1 Nov. 30, 2023

(30) Foreign Application Priority Data

Jun. 25, 2021 (CN) .......................... 202110712761.X (51) Int. Cl.
G06F 3/044 (2006.01)
G06F 3/041 (2006.01)
(52) U.S. Cl.
CPC .......... G06F 3/0446 (2019.05); G06F 3/0412 (2013.01); G06F 3/04164 (2019.05);
(Continued)

(58) Field of Classification Search
CPC .... G06F 1/169; G06F 3/04164; G06F 3/0443; G06F 3/0446; G06F 2203/04103;
(Continued)

(56) References Cited

U.S. PATENT DOCUMENTS 11,703,978 B2 * 7/2023 Yan .................. G06F 3/04164
345/174
2014/0104509 A1 4/2014 Fang et al.
(Continued)

FOREIGN PATENT DOCUMENTS

CN 103729081 A 4/2014
CN 103853395 A 6/2014
(Continued)

*Primary Examiner* — Nelson M Rosario
(74) *Attorney, Agent, or Firm* — WHDA, LLP (57) ABSTRACT

A touch substrate manufacturing method, for manufacturing a target touch substrate to be assembled with a display substrate, is provided. A size of an active display region of the display substrate is a first preset size. The method includes: providing a touch substrate to be processed having a second preset size, the second preset size being greater than the first preset size; and cutting, in at least one cutting direction, the touch substrate to be processed to obtain the target touch substrate, the cutting direction being parallel to an extending direction of a touch channel on the touch (Continued)

substrate to be processed. A manufacturing method for touch module, a touch substrate and a touch module are also provided.

16 Claims, 5 Drawing Sheets

(52) U.S. Cl.
CPC .............. *G06F 2203/04102* (2013.01); *G06F 2203/04103* (2013.01)

(58) Field of Classification Search
CPC ...................... H05K 3/30; H05K 1/189; H05K 2201/10121; H05K 2201/10151; H05K 2201/10977; H05K 3/321; Y10T 29/49155
See application file for complete search history.

(56) References Cited

U.S. PATENT DOCUMENTS

| | | | |
|---|---|---|---|
| 2017/0160850 A1 | 6/2017 | Cao et al. | |
| 2020/0278771 A1* | 9/2020 | Keefer | ..................... H05K 3/00 |
| 2020/0356231 A1 | 11/2020 | Ding et al. | |
| 2021/0004110 A1* | 1/2021 | Jeong | ..................... G06F 1/3262 |
| 2021/0109617 A1* | 4/2021 | Lin | ..................... H01L 27/1214 |

FOREIGN PATENT DOCUMENTS

| | | |
|---|---|---|
| CN | 105353921 A | 2/2016 |
| CN | 108415610 A | 8/2018 |
| CN | 111965870 A | 11/2020 |
| CN | 215642660 U | 1/2022 |
| JP | 2015-079436 A | 4/2015 |

\* cited by examiner

TOUCH SUBSTRATE, TOUCH SUBSTRATE MANUFACTURING METHOD, TOUCH MODULE AND MANUFACTURING METHOD FOR TOUCH MODULE

CROSS-REFERENCE TO RELATED APPLICATIONS

This application is the U.S. national phase of PCT Application No. PCT/CN2022/079322 filed on Mar. 4, 2022, which claims priority to Chinese Patent Application No. 202110712761.X, filed in China on Jun. 25, 2021, which is incorporated herein by reference in its entirety.

TECHNICAL FIELD

The present disclosure relates to the technical field of manufacturing a display product, and particularly, to a touch substrate and a touch substrate manufacturing method, as well as a touch module and a manufacturing method for touch module.

BACKGROUND

With the wide application of intelligent product in daily life, information presentation at sites such as smart business and retail are performed by adding LED display screen, liquid crystal display, and the like. For display products, there are many panel TFT production lines, which can meet appearance requirements for display products having different sizes, especially for a display screen with special aspect ratio. For example, 21.0-inch elongated screen, 50-inch square screen, and the like. A touch panel, as one of human-machine interaction methods, has natural advantages such as a simple machine structure, a timely information interaction, and which can improve user experiences. However, in most application scenarios, when compared with display products, touch screen products correspond to functional requirement such as presentation experience, and thus it is difficult to have a large-scale batch demand for such products.

In order to meet the display region requirements for LCM (LCD module) AA (active area), a mask (mask plate) needs to be developed separately to prepare a TP (touch) product with a specific size. Due to a high cost of a full set of masks, profitability cannot be guaranteed when the demand for the products are insufficient. Therefore, it is difficult to meet the need for a small batch of sample products from a certain customer. When the business and retail terminal cannot provide a machine integrated with both touch and display functions for user experience and operation, it is hard to propose or feedback a demand for products with touch interaction function.

Therefore, in the application of innovative products, there is an imbalance between the leading of demand and high development cost for such touch products, and it is not easy to meet the preparation requirements of sample products with special aspect ratio and size through low development cost.

SUMMARY

To address the above issues, the present disclosure provides a touch substrate and a touch substrate manufacturing method, and a touch module and a manufacturing method for touch module. A mask plate needs not to be re-developed when manufacturing a touch substrate with an unconventional size, and the cost will not increase.

In order to achieve this, embodiments of the present disclosure provides the following technical solutions. A touch substrate manufacturing method, for manufacturing a target touch substrate to be assembled with a display substrate, where a size of an active display region of the display substrate is a first preset size, and the method includes:
  providing a touch substrate to be processed having a second preset size, the second preset size being greater than the first preset size; and
  cutting, in at least one cutting direction, the touch substrate to be processed to obtain the target touch substrate, the cutting direction being parallel to an extending direction of a touch channel on the touch substrate to be processed.

Optionally, the touch substrate to be processed is fabricated with a mask assembly having a third preset size.

Optionally, the first preset size is M×N mm$^2$, and a size of an active touch region of the target touch substrate is (M+x)×(N+x) mm$^2$, where x is greater than zero.

Optionally, before cutting the touch substrate to be processed, the method further includes:
  forming a cutting line on the touch substrate to be processed, a position of the cutting line being located at a gap between two adjacent touch channels.

Optionally, the quantity of active touch channels of the target touch substrate is a×b.

The quantity of touch channels located in an area of the touch substrate to be processed inside a cutting line is (a+1)×b, or the quantity of touch channels located in the area of the touch substrate to be processed inside the cutting line is (a+1)×(b+1)

Optionally, an (a+1)-th touch channel on the touch substrate to be processed is connected to a ground terminal on a touch chip via a flexible printed circuit, and the (a+1)-th touch channel is arranged to be adjacent to the cutting line; and/or a (b+1)-th touch channel on the touch substrate to be processed is connected to a ground terminal on the touch chip via the flexible printed circuit, and the (b+1)-th touch channel is arranged to be adjacent to the cutting line.

Optionally, an (a+1)-th touch channel on the touch substrate to be processed is connected to a floating pin on a touch chip via a flexible printed circuit, and/or a (b+1)-th touch channel on the touch substrate to be processed is connected to a floating pin on the touch chip via the flexible printed circuit.

The embodiments of the present disclosure further provide a manufacturing method for touch module including a touch substrate, a flexible printed circuit and a touch IC connected to the touch substrate via the flexible printed circuit, where the manufacturing method for touch module is used for manufacturing a target touch substrate and a target flexible printed circuit, and includes:
  providing a touch module to be processed;
  manufacturing the target touch substrate by using the touch substrate manufacturing method as described above; and
  changing a connection manner for a flexible printed circuit and a touch IC in the touch module to be processed, for a connection to a touch channel on the target touch substrate.

Optionally, the quantity of active touch channels of the target touch substrate is a×b, and the quantity of touch channels located in an area of the touch substrate to be processed inside a cutting line is (a+1)×b, or the quantity of touch channels located in an area of the touch substrate to be processed inside a cutting line is (a+1)×(b+1).

The changing a connection manner for a flexible printed circuit and a touch IC in the touch module to be processed, for a connection to a touch channel on the target touch substrate specifically includes:

connecting a wiring of the flexible printed circuit which is connected to an (a+1)-th touch channel to a ground pin on the touch IC; and/or connecting a wiring of the flexible printed circuit which is connected to a (b+1)-th touch channel to a ground pin on the touch IC.

Optionally, the quantity of active touch channels of the target touch substrate is a×b, and the quantity of touch channels located in an area of the touch substrate to be processed inside a cutting line is (a+1)×b, or the quantity of touch channels located in an area of the touch substrate to be processed inside a cutting line is (a+1)×(b+1).

The changing a connection manner for a flexible printed circuit and a touch IC in the touch module to be processed, for a connection to a touch channel on the target touch substrate specifically includes:

connecting a wiring of the flexible printed circuit which is connected to an (a+1)-th touch channel to a floating pin on the touch IC; and/or connecting a wiring of the flexible printed circuit which is connected to a (b+1)-th touch channel to a floating pin on the touch IC.

Optionally, the method further includes:

determining whether a resistor-capacitor delay of the touch channel on the target touch substrate satisfies a driving requirement of the touch IC by simulating a resistance value of the touch channel; and in accordance with a determination that the resistor-capacitor delay of the touch channel on the target touch substrate does not satisfy the driving requirement of the touch IC, adjusting a film thickness of a conductive material on the touch channel to reduce the resistance value of the touch channel, the conductive material on the touch channel including a touch electrode.

The embodiments of the present disclosure further provide a touch substrate. The touch substrate includes a substrate, a plurality of first touch channels arranged to be extending in a first direction, and a plurality of second touch channels arranged to be extending in a second direction. At least a part of the plurality of first touch channels and the plurality of second touch channels extends to at least one cutting-side edge of the substrate.

Optionally, there is no gap between the plurality of first and second touch channels and the at least one cutting-side edge.

Optionally, a first sub-touch channel in the plurality of first touch channels, which is arranged to be in parallel to and adjacent to the cutting-side edge, is a signal shielding channel, and/or a second sub-touch channel in the plurality of second touch channels, which is arranged to be in parallel to and adjacent to the cutting-side edge, is a signal shielding channel.

Optionally, the touch substrate includes a first cutting-side edge arranged to be extending in the first direction, where a first sub-touch channel in the plurality of first touch channels, which is arranged to be in parallel to and adjacent to the first cutting-side edge, extends to the first cutting-side edge, and the plurality of first touch channels are led out via touch lead wires located at two opposite sides of the touch substrate.

Optionally, the touch substrate includes a second cutting-side edge arranged to be extending in the second direction, where a second sub-touch channel in the plurality of second touch channels, which is arranged to be in parallel to and adjacent to the second cutting-side edge, extends to the second cutting-side edge, and the plurality of first touch channels are led out via touch lead wires located at a side opposite to the second cutting-side edge on the touch substrate.

Optionally, the touch substrate includes a first cutting-side edge arranged to be extending in the first direction, and a second cutting-side edge arranged to be extending in the second direction.

A first sub-touch channel in the plurality of first touch channels, which is arranged to be in parallel to and adjacent to the first cutting-side edge, extends to the first cutting-side edge, a second sub-touch channel in the plurality of second touch channels, which is arranged to be in parallel to and adjacent to the second cutting-side edge, extends to the second cutting-side edge, and the plurality of first touch channels are led out via touch lead wires located at a side opposite to the second cutting-side edge on the touch substrate.

Optionally, the signal shielding channel is connected to a ground pin or a floating pin of a touch IC via a flexible printed circuit.

Embodiments of the present disclosure further provide a touch module, including the above-mentioned touch substrate.

Optionally, the touch module further includes a flexible printed circuit, and a touch IC in connection with the touch substrate by signals via the flexible printed circuit.

The present disclosure has following advantage: by cutting a touch substrate with a conventional size to form a touch substrate with a special size as required, there is no need to develop a new mask, the cost of developing a new product can be greatly reduced, and the production efficiency can be improved.

DETAILED DESCRIPTION

In order to make the objects, technical solutions and advantages of the embodiments of the present disclosure become apparent, the technical solution of the embodiments of the present disclosure will be described clearly in detail in conjunction with drawings of the embodiments of the present disclosure. Obviously, the described embodiments are some, rather that all, of the embodiments of the present disclosure. Based on the described embodiments of the present disclosure, all other embodiments obtained by those skilled in the art fall within the protection scope of the present disclosure.

In the description of the embodiments of the present disclosure, it should be understood that, an orientation or position relationship indicated by terms such as "middle", "upper", "lower", "left", "right", "vertical", "horizontal", "inside", "outside", or the like is based on the orientation or position relationship shown in the drawings. Such terms is used only for ease of description of the present disclosure and simplification of the description, rather than indicating or implying that the referred apparatus or element must have the specific orientation, or be constructed and operated in a particular orientation, and therefore this cannot be understood as a limitation on the present disclosure. Furthermore, the terms "first", "second", and "third" are only used for describing objects and cannot be understood as indicating or implying relative importance.

There may be following disadvantages in manufacturing a touch product of an unconventional size in the related art.

In manufacturing such a touch product, a newly developed mask (mask plate) should be designed to meet the requirements of Active Area (active touch region) with a special size.

The cost for developing a mask for a new product is high, and it is impossible to develop and customize such a mask for a project with less quantity demand;

If a new product uses a new mask for fabrication, the development cycle and the sample production cycle are long, and thus it is difficult to meet the characteristics of the new product such as a short development cycle and fast iteration.

To address those disadvantages, embodiments of the present disclosure provide a touch substrate manufacturing method, for manufacturing a target touch substrate to be assembled with a display substrate. A size of an active display region of the display substrate is a first preset size. The method includes:

providing a touch substrate to be processed having a second preset size, the second preset size being greater than the first preset size;

cutting, in at least one cutting direction, the touch substrate to be processed to obtain the target touch substrate, the cutting direction being parallel to an extending direction of a touch channel on the touch substrate to be processed.

FIGS. 1, 2, 4, and 6 show schematic structural diagrams of a touch substrate to be processed. FIGS. 3, 5, and 7 show schematic structural diagrams of a target touch substrate after a cutting operation is done. In the embodiment, the touch substrate to be processed is manufactured with an existing mask assembly. Namely, the touch substrate to be processed is a touch substrate with a conventional size which can be manufactured by using an existing mask plate, or can be selected from the touch substrates that have already been manufactured.

In the embodiment, the conventional touch substrate is used, and the touch substrate having the conventional size is cut to form the target touch substrate, such that the mask needs not to be re-developed. The cost of developing a new product can be greatly reduced, the development cycle of the new product can be greatly shortened, and the speed of developing the new product can be accelerated. The development pressure of the new product required by customers can be reduced. In the trial production and promotion for the new product of the end customer, the possibility of adding a corresponding touch function can be increased, which is helpful for the development of the touch product market.

In the embodiment, exemplarily, the first preset size is M×N mm$^2$ (millimeter), and a size of an active touch region of the target touch substrate is (M+x)×(N+x) mm$^2$, where x, M, and N are all greater than zero.

When manufacturing a target touch substrate, size information about the target touch substrate is obtained at first, including a size of an outline of a LCM (a LCD Module, a LCD display module and a liquid crystal module) to be assembled with the target touch substrate (which may facilitate subsequent selection of a cover plate having a suitable size when being assembled with the cover plate) and the size of the active display region, and then the size of the touch substrate to be processed is selected according to the size information about the LCM.

Compared with the active display region, the active touch region of the target touch substrate needs to extend outwardly by a preset distance for an edge, and the preset distance is greater than 1.5 mm. For example, when the size of the active display region is M×N mm$^2$, and the size of the active touch region of the target touch substrate is (M+3)×(N+3) mm$^2$, i.e., the preset value x is 3 mm, but the present disclosure is not limited thereto.

In the embodiment, exemplarily, before cutting the touch substrate to be processed, the method further includes the following steps.

Figure 2:
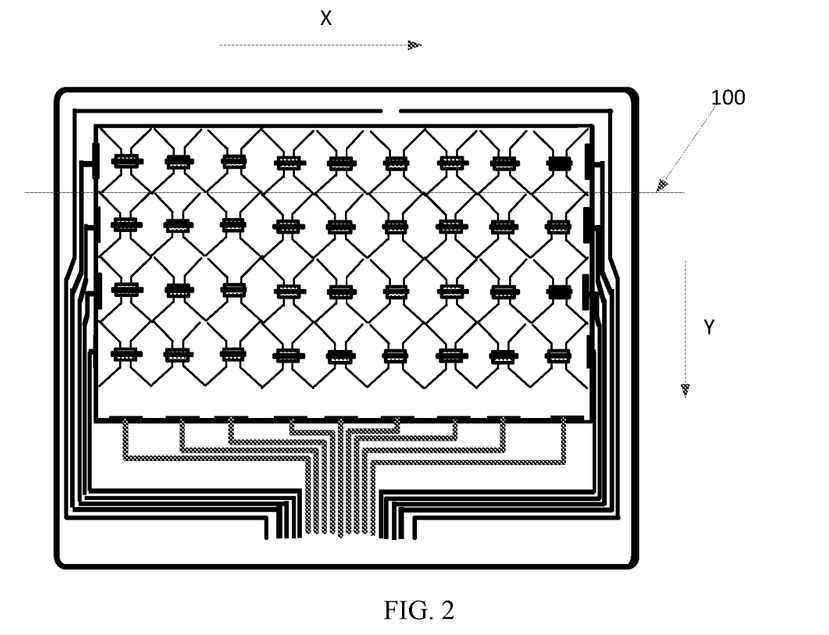
FIG. 2 is a schematic diagram of a first cutting state according to an embodiment of the present disclosure.
Figure 3:
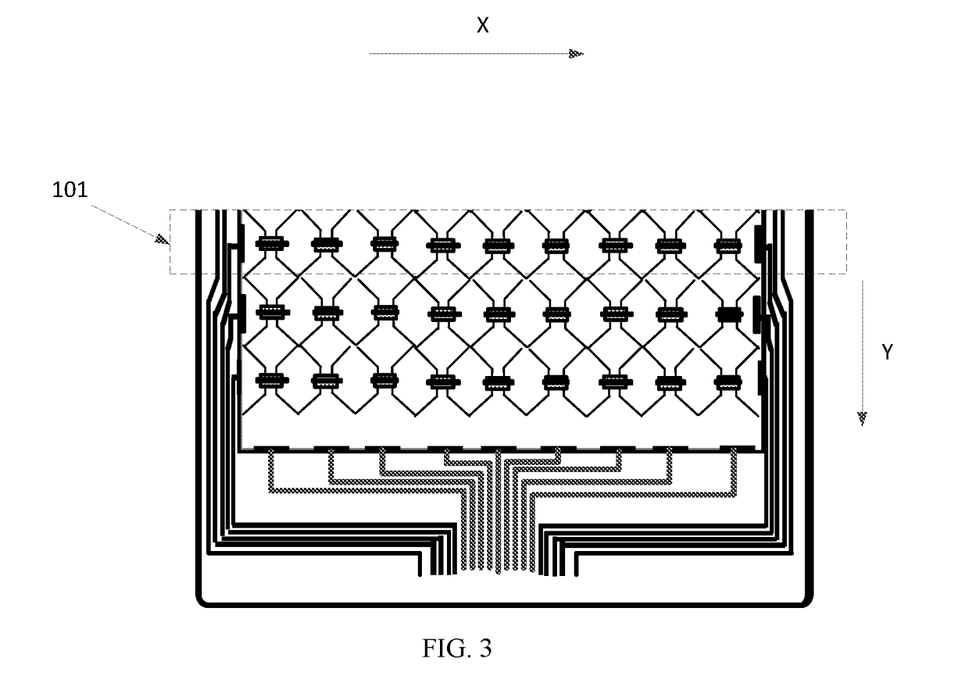
FIG. 3 is a first schematic structural diagram showing a target touch substrate according to an embodiment of the present disclosure.
Figure 4:
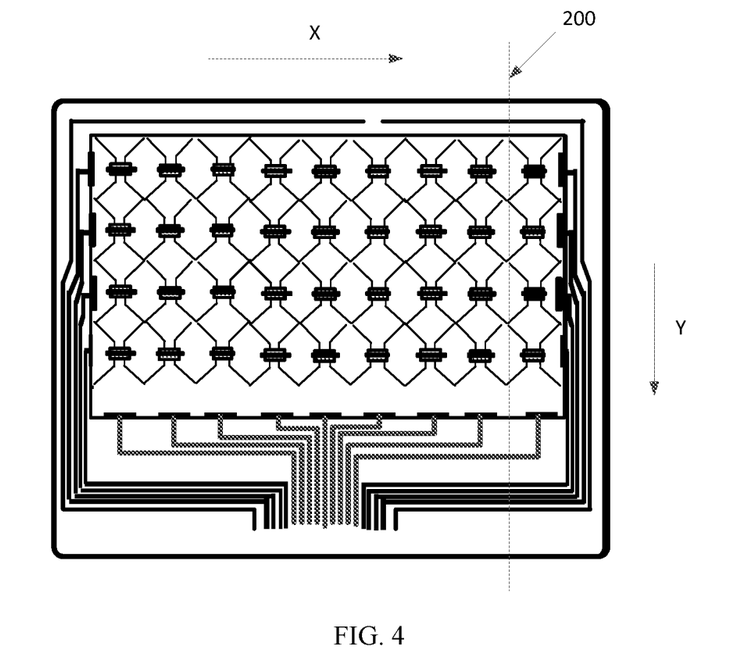
FIG. 4 is a schematic diagram of a second cutting state according to an embodiment of the present disclosure.
Figure 5:
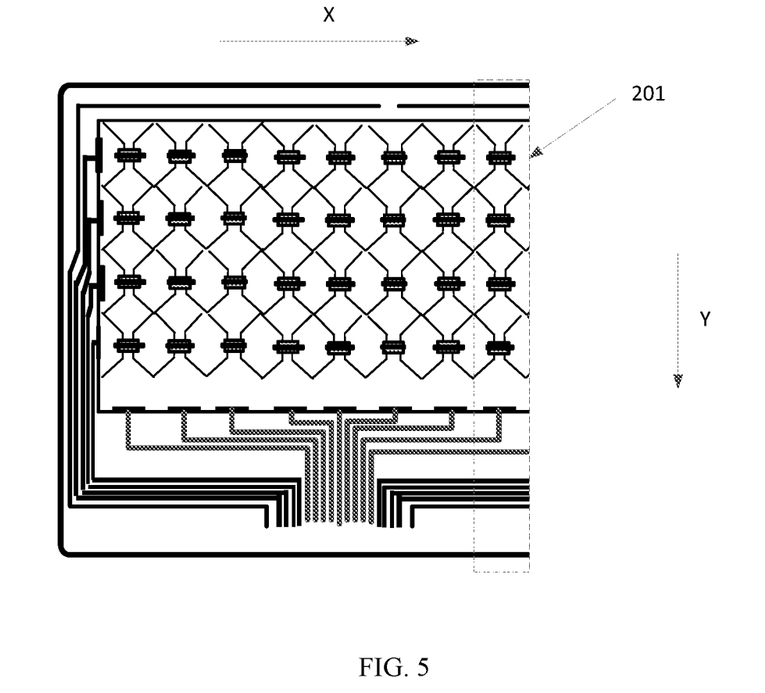
FIG. 5 is a second schematic structural diagram of a target touch substrate according to an embodiment of the present disclosure.
Figure 6:
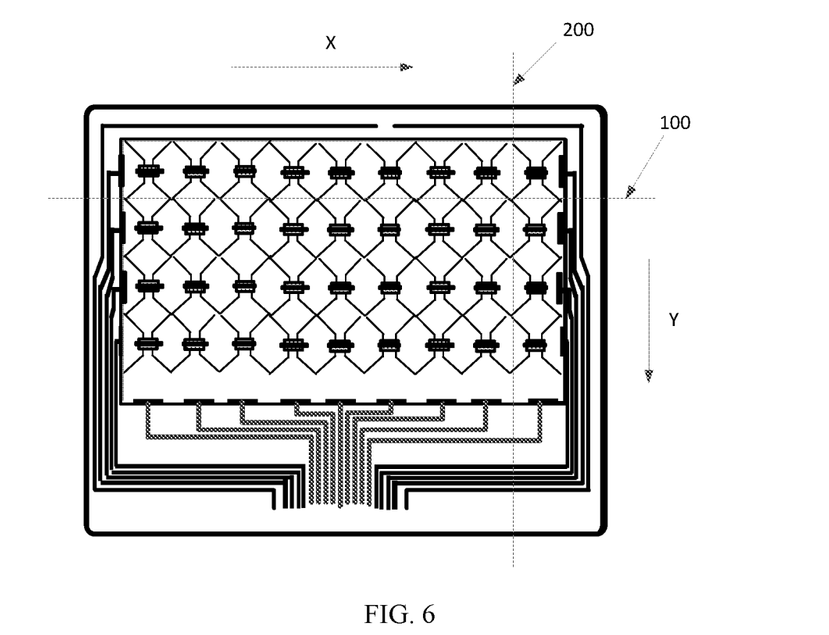
FIG. 6 is a schematic diagram of a third cutting state according to an embodiment of the present disclosure.
Figure 7:
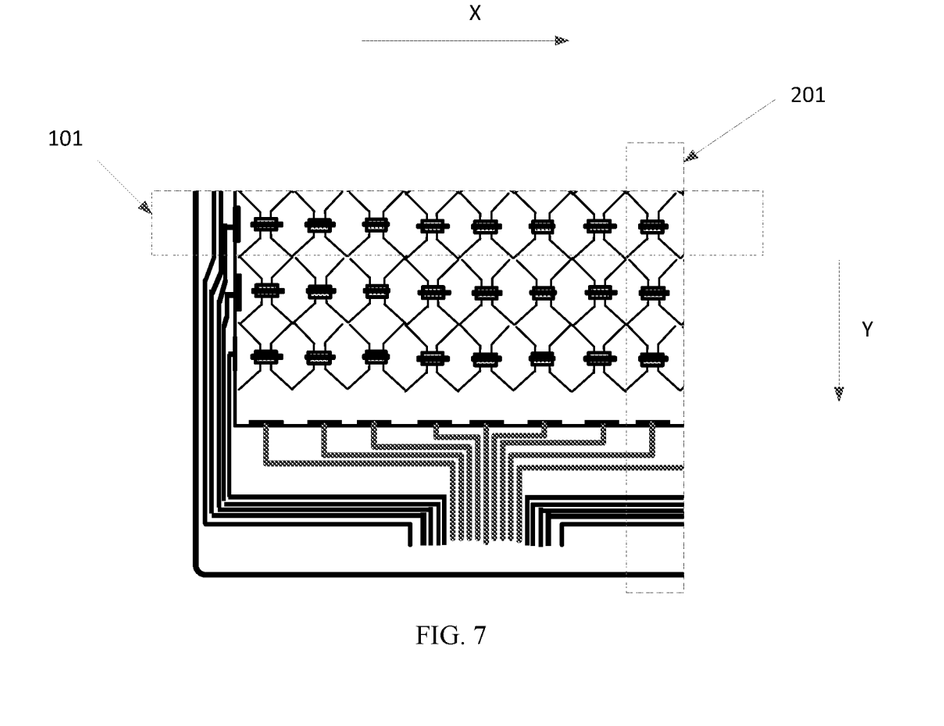
FIG. 7 is a third schematic structural diagram of a target touch substrate according to an embodiment of the present disclosure.

A cutting line is formed on the touch substrate to be processed, and a position of the cutting line is located between two adjacent touch channels, with reference to FIGS. 2, 4 and 6.

The touch channel is formed by multiple duplicative units of touch patterns. In order to ensure an active touch control at an edge, when setting a position for the cutting line, a full touch pattern should be included at a location in the active touch region corresponding to the edge of the active display region. Illustratively, the position of the cutting line is located between adjacent touch channels.

It is to be noted that the distribution of the touch channels on the touch substrate to be processed is fixed, and the distribution and the size of the touch patterns on each channel are also fixed. When forming the target touch substrate is by cutting, the size of the target touch substrate is also pre-defined. Due to the size setting requirement, there may be a case where the position for arranging the cutting line deviates from a first position, where the first position is a position between adjacent touch channels. Such a deviation of the cutting line may result in a partial touch pattern existed at a periphery of the target touch substrate.

Figure 8:
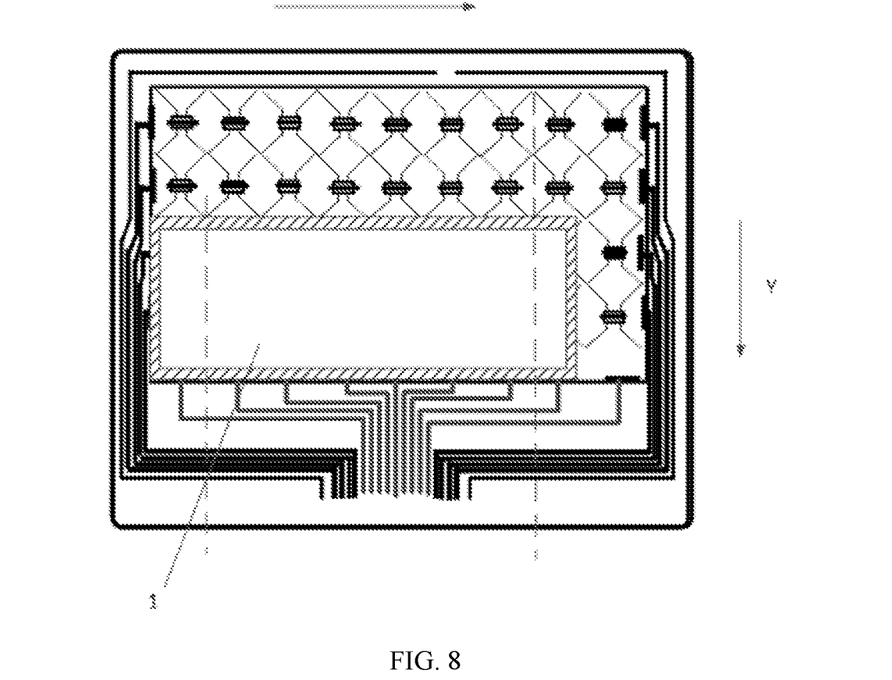
FIG. 8 is a schematic diagram showing a correspondence between a touch channel and a display substrate according to an embodiment of the present disclosure.

There are distance requirements such as cutting alignment accuracy and burn range which should be reserved for the cutting so as to ensure that the cutting process can be done, and the active channel at the periphery is designed to be a full pattern (touch pattern) as the active touch region of the touch product. With reference to FIG. 8, there is a full touch pattern at left edge of the active display region 1 of the display substrate, while there is an incomplete touch pattern at right edge of the active display region 1 of the display substrate. In this case, the display substrate needs to be moved, or the current touch substrate should be replaced by another appropriate touch substrate to be processed, so as to ensure the touch accuracy at the edge of the active display region.

Figure 1:
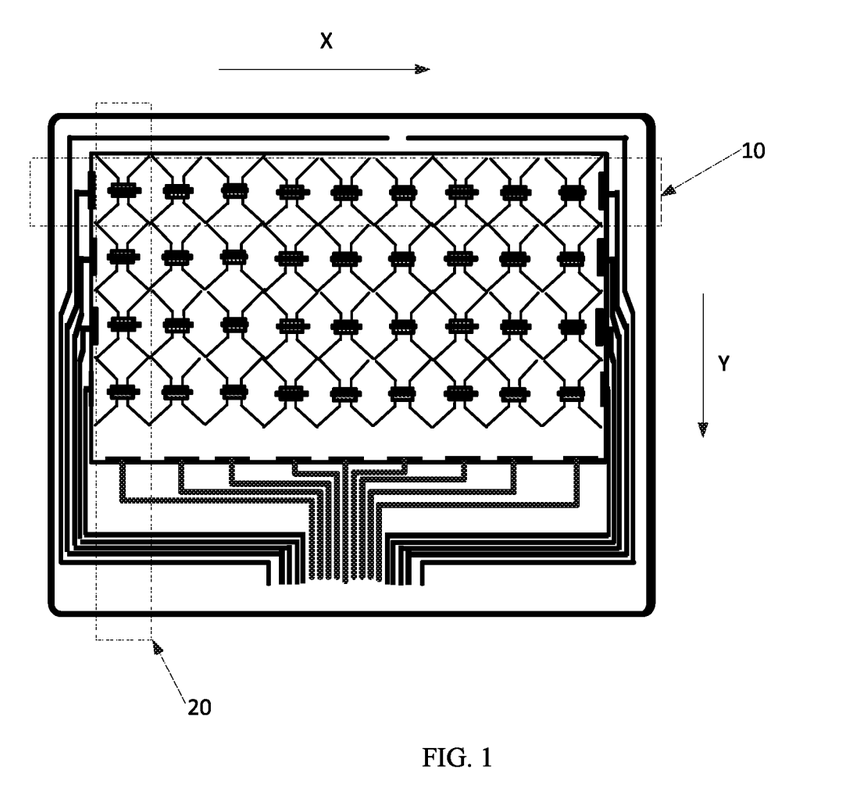
FIG. 1 is a schematic structural diagram of a touch substrate to be processed according to an embodiment of the present disclosure.

Generally, the touch substrate includes a driving touch channel 10 and a sensing touch channel 20, with reference to FIG. 1. The driving touch channel 10 and the sensing touch channel 20 are arranged to be intersected with each other. The touch substrate to be processed is cut to form a target touch substrate. According to actual needs, the cutting can be performed along one cutting direction (namely, cutting along a direction parallel to the extending direction of the driving touch channel, or cutting along a direction parallel to the extending direction of the sensing touch channel), or the cutting can also be performed along two cutting directions.

FIG. 2 is a schematic diagram showing a state in which the cutting is performed along a first direction (the X direction in the figure). FIG. 3 shows the target touch substrate obtained by cutting along a first cutting line 100 in FIG. 2. FIG. 4 is a schematic diagram showing a state in which the cutting is performed along a second direction (Y direction in the figure). FIG. 5 shows the target touch substrate obtained by cutting along a second cutting line 200 in FIG. 4. FIG. 6 is a schematic diagram showing the state in which the cutting is performed along both the first direction (X direction in the figure) and the second direction (Y direction in the figure). FIG. 7 shows the target touch substrate obtained by cutting according to the first cutting line 100 and the second cutting line 200 in FIG. 6.

In the embodiment, exemplarily, when the substrate to be processed is cut along one cutting direction, the quantity of active touch channels of the target touch substrate is a×b, and the quantity of touch channels located in an area of the touch substrate to be processed inside the cutting line is (a+1)×b, where a and b are both greater than 1.

In the embodiment, exemplarily, the (a+1)-th touch channel on the touch substrate to be processed is connected to a ground terminal on a touch chip via a flexible printed circuit.

In the embodiment, exemplarily, the (a+1)-th touch channel on the touch substrate to be processed is connected to a floating pin on a touch chip via a flexible printed circuit.

The first sub-touch channel 101 in FIG. 3 and the second sub-touch channel 201 in FIG. 5 are the (a+1)-th touch channel.

Since the cutting operation results in a lack of grounding for the touch channel extending in said direction, the channel at the edge of the cutting line needs to be grounded through the flexible printed circuit or floating, so as to ensure the accuracy of the touch control at the edge region.

When assembling with the glass cover plate, a side of the touch substrate on which the touch electrode is provided may face the glass cover plate or may face away from the glass cover plate.

In the embodiment, exemplarily, when the substrate to be processed is cut along two cutting directions, the quantity of the active touch channels of the target touch substrate is a×b, and the quantity of touch channels located in an area of the touch substrate to be processed inside the cutting line is (a+1)×(b+1).

Since the cutting results operation in a lack of grounding for the touch channel, the channel at the edge of the cutting line needs to be grounded through the flexible printed circuit or floating, so as to ensure the accuracy of the touch control at the edge region.

In the embodiment, exemplarily, the (a+1)-th touch channel on the touch substrate to be processed is connected to a ground terminal on a touch chip via a flexible printed circuit, and the (b+1)-th touch channel on the touch substrate to be processed is connected to a ground terminal on the touch chip via the flexible printed circuit.

In the embodiment, exemplarily, the (a+1)-th touch channel on the touch substrate to be processed is connected to a floating pin on a touch chip via a flexible printed circuit, and the (b+1)-th touch channel on the touch substrate to be processed is connected to a floating pin on the touch chip via the flexible printed circuit.

The first sub-touch channel 101 in FIG. 7 is the (a+1)-th touch channel, and the second sub-touch channel 201 is the (b+1)-th touch channel.

Embodiments of the present disclosure further provide a manufacturing method for touch module. The touch module includes a touch substrate, a flexible printed circuit, and a touch IC (integrated circuit) connected to the touch substrate via the flexible printed circuit. The method is used for manufacturing a target touch substrate and a target flexible printed circuit. The method includes:

providing a touch module to be processed;

manufacturing the target touch substrate by using the touch substrate manufacturing method as described above; and changing a connection manner for a flexible printed circuit and a touch IC in the touch module to be processed, for a connection to a touch channel on the target touch substrate.

In the embodiment, exemplarily, when the touch substrate to be processed is cut along one cutting direction, the quantity of the active touch channels of the target touch substrate is a×b, and the quantity of the touch channels located in the area of the touch substrate to be processed inside the cutting line is (a+1)×b.

The changing the connection manner for the flexible printed circuit and the touch IC in the touch module to be processed, for the connection to the touch channel on the target touch substrate may, for example includes:

connecting a wiring of the flexible printed circuit which is connected to the (a+1)-th touch channel to a ground pin on the touch IC.

In the embodiment, exemplarily, when the touch substrate to be processed is cut along one cutting direction, the quantity of the active touch channels of the target touch substrate is a×b, and the quantity of touch channels located in the area of the touch substrate to be processed inside the cutting line is (a+1)×b.

The changing the connection manner for the flexible printed circuit and the touch IC in the touch module to be processed, for the connection to the touch channel on the target touch substrate may, for example includes:

connecting a wiring of the flexible printed circuit which is connected to the (a+1)-th touch channel to a floating pin on the touch IC.

In the embodiment, exemplarily, when a touch substrate to be processed is cut along two cutting directions, the quantity of active touch channels of the target touch substrate is a×b, and the quantity of touch channels located in the area of the touch substrate to be processed inside the cutting line is (a+1)×(b+1), where a and b are both greater than 1.

The changing the connection manner for the flexible printed circuit and the touch IC in the touch module to be processed, for the connection to the touch channel on the target touch substrate may, for example includes:

connecting a wiring of the flexible printed circuit which is connected to the (a+1)-th touch channel to a ground pin on the touch IC; and
   connecting a wiring of the flexible printed circuit which is connected to the (b+1)-th touch channel to a ground pin on the touch IC.

In the embodiment, exemplarily, when a touch substrate to be processed is cut along two cutting directions, the quantity of active touch channels of the target touch substrate is a×b, and the quantity of touch channels located in the area of the touch substrate to be processed inside the cutting line is (a+1)×(b+1), where a and b are both greater than 1.

The changing the connection manner for the flexible printed circuit and the touch IC in the touch module to be processed, for the connection to the touch channel on the target touch substrate may, for example includes:

connecting a wiring of the flexible printed circuit which is connected to the (a+1)-th touch channel to a floating pin on the touch IC; and
   connecting a wiring of the flexible printed circuit which is connected to the (b+1)-th touch channel to a floating pin on the touch IC.

Figure 9:
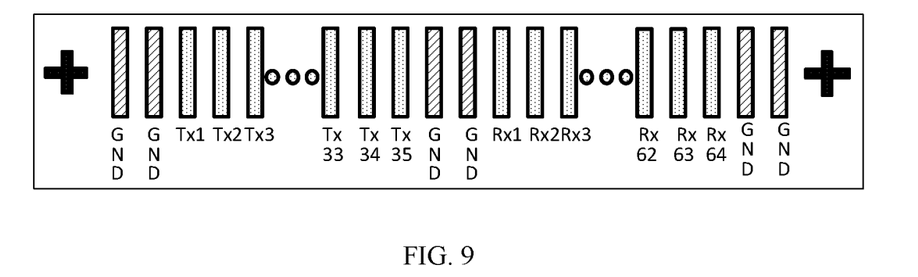
FIG. 9 is a schematic structural diagram of a flexible printed circuit in a touch module to be processed according to an embodiment of the present disclosure.
Figure 10:
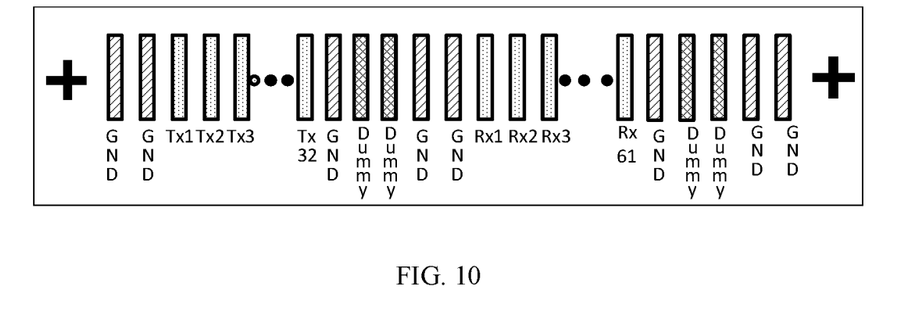
FIG. 10 is a schematic structural diagram of a flexible printed circuit with a connection manner for the flexible printed circuit and a touch IC being changed according to an embodiment of the present disclosure.

FIGS. 9 and 10 show the flexible printed circuit before and after being cut along two directions, respectively. Since after the cutting is done, on the flexible printed circuit which is bonded to the touch substrate to be processed, the wirings connecting to the cut-off touch channels are invalid (with reference to FIG. 9, connecting lines denoted as Tx33, Tx34 and Tx35, and to FIG. 10, a connecting line denoted as Tx32, an adjacent GND line and dummy lines Dummy; with reference to FIG. 9, connecting lines denoted as Rx62, Rx63 and Rx64, and to FIG. 10, a connecting line denoted as Rx61, an adjacent GND line and dummy lines Dummy). The (a+1)-th touch channel and/or (b+1)-th touch channel on the target touch substrate no longer functions as touch control, but functions as preventing static electricity or signal shielding (the connecting line denoted as Tx33 in FIG. 9 is changed to be GND line, and the connecting line denoted as Rx62 in FIG. 9 is changed to be GND line). As such, the circuit design for the flexible printed circuit which is bonded to the touch substrate to be processed does not match the circuit arrangement for the target touch substrate, and it is difficult to directly make a change on the original flexible printed circuit. In the embodiment, a new flexible printed circuit is manufactured, and the circuit design of this flexible printed circuit is changed with respect to the original flexible printed circuit to match the circuit on the target touch substrate. In this way, the touch channels in the active touch region are connected to the touch pin on the touch IC. The (a+1)-th channel is connected to a ground pin or a floating pin on the touch IC, and/or the (b+1)-th touch channel is connected to a ground pin or a floating pin on the touch IC.

In the embodiment, exemplarily, the method further includes:

determining, by simulating a resistance value of the touch channel, whether a resistor-capacitor delay of the touch channel on the target touch substrate satisfies a driving requirement of the touch IC;
   in accordance with a determination that the resistor-capacitor delay of the touch channel on the target touch substrate does not satisfy the driving requirement of the touch IC, adjusting a film thickness of a conductive material on the touch channel, so as to reduce the resistance value of the touch channel, the conductive material on the touch channel including a touch electrode.

In the embodiment, the film thickness of the conductive material on the touch channel is directly proportional to the resistance value of the touch channel. The longitudinal dimension of the touch substrate to be processed is set as L, and the long longitudinal direction is parallel to the extending direction of the driving touch channel. The longitudinal dimension of the target touch substrate is set as L'. The touch substrate to be processed adopts a 2T1R design, and the target touch substrate is changed to a 1T1R wiring driving design. In the case of an optimal cutting (namely, the cutting line is located outside the active touch region of the touch substrate to be processed, only the touch lead wires located on one side of the touch substrate are cut and removed, while the length of the driving touch channel is unchanged), a ratio of the resistance value Rs' of the driving touch channel of the target touch substrate to the resistance value Rs of the driving touch channel of the touch substrate to be processed is: Rs'/Rs=L'/L=2. As the resistance value of the target touch substrate may increase, the resistance value of the driving touch channel can be reduced by reducing the film thickness of the conductive material included in the driving touch channel.

It is noted that in the embodiment, the touch patterns in the driving touch channel and the sensing touch channel are formed using a synchronous process, and therefore, the film thicknesses of the conductive materials of the driving touch channel and the sensing touch channel are uniformly reduced.

According to actual requirement of the touch IC, when detecting the resistance value, only the resistance value of the driving touch channel may be detected, or only the resistance value of the sensing touch channel may be detected, or the resistance value of the driving touch channel and the resistance value of the sensing touch channel may be detected simultaneously.

In the embodiment, one side of the touch substrate to be processed is provided with a bonding region for a bonding connection with the flexible printed circuit. The bonding region is provided in the middle of the touch region in the first direction or the second direction. In order to prevent the bonding region from being cut, the length for the cut-off region does not exceed ½ of the total length of the corresponding edge.

With reference to FIGS. 2-8, embodiments of the present disclosure further provide a touch substrate. The touch substrate includes a substrate, a plurality of first touch channels arranged to be extending in a first direction, and a plurality of second touch channels arranged to be extending in a second direction. At least part of the plurality of first touch channels and the plurality of second touch channels extends to at least one cutting-side edge of the substrate.

In the embodiment, the touch substrate is the target touch substrate described above, which is formed by cutting a substrate to be processed. At least part of the plurality of first touch channels and the plurality of second touch channels extends to at least one cutting-side edge of the substrate. That is, the first touch channel and/or the second touch channel at the cutting-side edge have a full touch pattern or an incomplete touch pattern. In the embodiment, a touch substrate of a required size can be obtained without re-developing a new mask, thereby saving manufacturing cost and improving efficiency.

In the embodiment, exemplarily, there is no gap between the plurality of first touch channels and the plurality of second touch channels and the at least one cutting-side edge.

The touch substrate in the embodiment is formed by cutting the substrate to be processed with a size greater than that of the target touch substrate. There is no wiring (such as a GND line or a touch lead wire) between the cutting-side edge and the first touch channel or the second touch channel adjacent to the cutting-side edge.

In the embodiment, exemplarily, a first sub-touch channel in the plurality of first touch channels which is arranged to be in parallel to and adjacent to the cutting-side edge of is a signal shielding channel, and/or a second sub-touch channel in the plurality of second touch channels which is arranged to be in parallel to and adjacent to the cutting-side edge of is a signal shielding channel.

In the embodiment, the cutting-side edge may be located on one side of the touch substrate, or may be located on two adjacent sides of the touch substrate. When the cutting-side edge is located on one side of the touch substrate, an extending direction of the cutting-side edge may be a direction parallel to the first direction, or may be a direction parallel to the second direction. Several cutting modes which may be used in the embodiment are described in detail below.

First cutting mode: in the embodiment, exemplarily, the touch substrate includes a first cutting-side edge arranged to be extending in the first direction. A first sub-touch channel 101 in the plurality of first touch channels, which is arranged to be in parallel to and adjacent to the first cutting-side edge, extends to the first cutting-side edge, and the plurality of first touch channels are led out via touch lead wires located at two sides opposite to the touch substrate.

After an upper end of the substrate to be processed in FIG. 2 is cut, the target touch substrate in FIG. 3 is formed. In FIG. 2, the first cutting line 100 is located at the upper portion of the substrate to be processed. Touch lead wires for connecting to the plurality of first touch channels are located at two sides of the touch substrate adjacent to the first cutting-side edge. Touch lead wires connected to the plurality of second touch channels are located on the bottom of the touch substrate, namely, a side of the touch substrate opposite to the first cutting-side edge. A bonding region for bonding connection with a flexible printed circuit is provided at the side of the touch substrate opposite to the first cutting-side edge.

In FIG. 3, the first sub-touch channel 101 is a complete channel. The first sub-touch channel 101 includes multiple duplicative units of touch patterns, and each touch pattern is complete, but the disclosure is not limited thereto. In some embodiments, due to the size definition, the first sub-touch channel 101 may be incomplete, and the touch patterns included therein are also incomplete.

Second cutting mode: with reference to FIGS. 4 and 5, in the embodiment, exemplarily, the touch substrate includes a second cutting-side edge arranged to extend in the second direction. A second sub-touch channel in the plurality of second touch channels, which is arranged to be in parallel to and adjacent to the second cutting-side edge, extends to the second cutting-side edge, and the plurality of first touch channels are led out via the touch lead wires located at one side opposite to the second cutting-side edge on the touch substrate.

The second cutting mode differs from the first cutting mode in that: the positions of the cutting lines are different, namely, the positions of the cutting-side edges are different. In the embodiment, an extending direction of the second cutting-side edge is parallel to the second direction, and said edge is located on the right side of the touch substrate. In FIG. 4, the second cutting line 200 is located on the right side of the substrate to be processed, and the touch lead wires on this side are cut off when performing the cutting. Therefore, in the touch substrate on which the cutting is done, the plurality of first touch channels are led out by the touch lead wires located on one side of the touch substrate, namely, the touch lead wires for leading out the plurality of first touch channels are located on the side opposite to the second cutting-side edge. The plurality of second touch channels are led out by the touch lead wires located on the side adjacent to the second cutting-side edge.

In the embodiment, The second sub-touch channel 201 in the plurality of second touch channels is a signal shielding channel.

Third cutting mode: with reference to FIGS. 6 and 7, in the embodiment, the first cutting mode and the second cutting mode are combined. Specifically, the touch substrate includes a first cutting-side edge arranged to be extending in the first direction and a second cutting-side edge arranged to be extending in the second direction.

A first sub-touch channel in the plurality of first touch channels, which is arranged to be in parallel to and adjacent to the first cutting-side edge, extends to the first cutting-side edge. A second sub-touch channel in the plurality of second touch channels, which is arranged to be in parallel to and adjacent to the second cutting-side edge, extends to the second cutting-side edge. The plurality of first touch channels are led out via the touch lead wires located at one side opposite to the second cutting-side edge on the touch substrate.

With reference to FIGS. 6 and 7, the touch substrate includes a first sub-touch channel 101 arranged to be extending to the first cutting-side edge, and a second sub-touch channel 201 arranged to be extending to the second cutting-side edge. Touch lead wires leading out the plurality of first touch channels are located on a side opposite to the second cutting-side edge, and the plurality of second touch channels are led out by touch lead wires located on a side adjacent to the second cutting-side edge.

In the embodiment, exemplarily, the signal shielding channel is connected to a ground pin or a floating pin of the touch IC via the flexible printed circuit.

In FIG. 3, the first sub-touch channel 101 is the signal shielding channel. In FIG. 5, the second sub-touch channel 201 is the signal shielding channel. In FIG. 7, both the first sub-touch channel 101 and the second sub-touch channel 201 are signal shielding channels.

The signal shielding channel is connected to the ground pin or the floating pin of the touch IC via the flexible printed circuit, so as to realize the function of shielding signals.

Embodiments of the present disclosure further provide a touch module, including the above-mentioned touch substrate.

In the embodiment, exemplarily, the touch module further includes a flexible printed circuit and a touch IC in connection with the touch substrate using signals via the flexible printed circuit.

After the cutting, some of the first touch channels and/or some of the second touch channels are cut off, and the corresponding wiring mode needs to be changed.

FIGS. 9 and 10 show the flexible printed circuit before and after being cut along two directions, respectively. Since after the cutting is done, on the flexible printed circuit which is bonded to the touch substrate to be processed, the wirings connecting to the cut-off touch channels are invalid (with reference to FIG. 9, connecting lines denoted as Tx33, Tx34 and Tx35, and to FIG. 10, a connecting line denoted as Tx32, an adjacent GND line and dummy lines Dummy; with reference to FIG. 9, connecting lines denoted as Rx62, Rx63 and Rx64, and to FIG. 10, a connecting line denoted as Rx61, an adjacent GND line and dummy lines Dummy). The (a+1)-th touch channel and/or (b+1)-th touch channel on the target touch substrate no longer functions as touch control, but functions as preventing static electricity or signal shielding (the connecting line denoted as Tx33 in FIG. 9 is changed to be GND line, and the connecting line denoted as Rx62 in FIG. 9 is changed to be GND line). As such, the circuit design for the flexible printed circuit which is bonded to the touch substrate to be processed does not match the circuit arrangement for the target touch substrate, and it is difficult to directly make a change on the original flexible printed circuit. In the embodiment, a new flexible printed circuit is manufactured, and the circuit design of this flexible printed circuit is changed with respect to the original flexible printed circuit to match the circuit on the target touch substrate. In this way, the touch channels in the active touch region are connected to the touch pin on the touch IC. The (a+1)-th channel is connected to a ground pin or a floating pin on the touch IC, and/or the (b+1)-th touch channel is connected to a ground pin or a floating pin on the touch IC.

It is to be understood that the above embodiments are merely exemplary embodiments for illustrating the principles of the present disclosure, and the disclosure is not limited thereto. It will be apparent to those skilled in the art that various modifications and variations can be made without departing from the spirit or scope of the disclosure, and such modifications and variations fall within the scope of the disclosure.

What is claimed is:

1. A touch substrate manufacturing method, for manufacturing a target touch substrate to be assembled with a display substrate, wherein a size of an active display region of the display substrate is a first preset size, and the method includes:
   providing a touch substrate to be processed having a second preset size, the second preset size being greater than the first preset size; and
   cutting, in at least one cutting direction, the touch substrate to be processed to obtain the target touch substrate, the cutting direction being parallel to an extending direction of a touch channel on the touch substrate to be processed;
   wherein the first preset size is M×N mm$^2$, and a size of an active touch region of the target touch substrate is (M+x)×(N+x) mm$^2$, wherein x is greater than zero.

2. The touch substrate manufacturing method according to claim 1, wherein the touch substrate to be processed is fabricated with a mask assembly having a third preset size.

3. The touch substrate manufacturing method according to claim 1, wherein before cutting the touch substrate to be processed, the method further includes:
   forming a cutting line on the touch substrate to be processed, a position of the cutting line being located at a gap between two adjacent touch channels.

4. The touch substrate manufacturing method according to claim 1, wherein the quantity of active touch channels of the target touch substrate is a×b; and
   the quantity of touch channels located in an area of the touch substrate to be processed inside a cutting line is (a+1)×b, or the quantity of touch channels located in the area of the touch substrate to be processed inside the cutting line is (a+1)×(b+1).

5. The touch substrate manufacturing method according to claim 4, wherein an (a+1)-th touch channel on the touch substrate to be processed is connected to a ground terminal on a touch chip via a flexible printed circuit, and the (a+1)-th touch channel is arranged to be adjacent to the cutting line; and/or a (b+1)-th touch channel on the touch substrate to be processed is connected to a ground terminal on the touch chip via the flexible printed circuit, and the (b+1)-th touch channel is arranged to be adjacent to the cutting line.

6. The touch substrate manufacturing method according to claim 4, wherein an (a+1)-th touch channel on the touch substrate to be processed is connected to a floating pin on a touch chip via a flexible printed circuit, and/or a (b+1)-th touch channel on the touch substrate to be processed is connected to a floating pin on the touch chip via the flexible printed circuit.

7. A manufacturing method for touch module including a touch substrate, a flexible printed circuit and a touch IC connected to the touch substrate via the flexible printed circuit, wherein the manufacturing method for touch module is used for manufacturing a target touch substrate and a target flexible printed circuit, and includes:
   providing a touch module to be processed; and
   manufacturing the target touch substrate by using the touch substrate manufacturing method according to claim 1; and
   changing a connection manner for a flexible printed circuit and a touch IC in the touch module to be processed, for a connection to a touch channel on the target touch substrate.

8. The manufacturing method for touch module according to claim 7, wherein the quantity of active touch channels of the target touch substrate is a×b, and the quantity of touch channels located in an area of the touch substrate to be processed inside a cutting line is (a+1)×(b+1); and
   the changing a connection manner for a flexible printed circuit and a touch IC in the touch module to be processed, for a connection to a touch channel on the target touch substrate includes:
   connecting a wiring of the flexible printed circuit which is connected to an (a+1)-th touch channel to a ground pin on the touch IC; and
   connecting a wiring of the flexible printed circuit which is connected to a (b+1)-th touch channel to a ground pin on the touch IC.

9. The manufacturing method for touch module according to claim 7, wherein the quantity of active touch channels of the target touch substrate is a×b, and the quantity of touch channels located in an area of the touch substrate to be processed inside a cutting line is (a+1)×(b+1); and
   the changing a connection manner for a flexible printed circuit and a touch IC in the touch module to be processed, for a connection to a touch channel on the target touch substrate includes:
   connecting a wiring of the flexible printed circuit which is connected to an (a+1)-th touch channel on the touch IC; and
   connecting a wiring connected to a (b+1)-th touch channel on the flexible printed circuit to the floating pin on the touch IC.

10. The manufacturing method for touch module according to claim 7, further including:
    determining whether a resistor-capacitor delay of the touch channel on the target touch substrate satisfies a driving requirement of the touch IC by simulating a resistance value of the touch channel; and in accordance with a determination that the resistor-capacitor delay of the touch channel on the target touch substrate does not satisfy the driving requirement of the touch IC, adjusting a film thickness of a conductive material on the touch channel to reduce the resistance value of the touch channel, the conductive material on the touch channel including a touch electrode.

11. A touch substrate, including a substrate, a plurality of first touch channels arranged to be extending in a first direction, and a plurality of second touch channels arranged to be extending in a second direction, wherein at least a part of the plurality of first touch channels and the plurality of second touch channels extends to at least one cutting-side edge of the substrate; and wherein the touch substrate includes a first cutting-side edge arranged to be extending in the first direction, wherein a first sub-touch channel in the plurality of first touch channels, which is arranged to be in parallel to and adjacent to the first cutting-side edge, extends to the first cutting-side edge, and the plurality of first touch channels are led out via touch lead wires located at two opposite sides of the touch substrate;

or wherein the touch substrate includes a second cutting-side edge arranged to be extending in the second direction, wherein a second sub-touch channel in the plurality of second touch channels, which is arranged to be in parallel to and adjacent to the second cutting-side edge, extends to the second cutting-side edge, and the plurality of first touch channels are led out via touch lead wires located at a side opposite to the second cutting-side edge on the touch substrate;

or wherein the touch substrate includes a first cutting-side edge arranged to be extending in the first direction, and a second cutting-side edge arranged to be extending in the second direction; wherein a first sub-touch channel in the plurality of first touch channels, which is arranged to be in parallel to and adjacent to the first cutting-side edge, extends to the first cutting-side edge, a second sub-touch channel in the plurality of second touch channels, which is arranged to be in parallel to and adjacent to the second cutting-side edge, extends to the second cutting-side edge, and the plurality of first touch channels are led out via touch lead wires located at a side opposite to the second cutting-side edge on the touch substrate.

12. The touch substrate according to claim 11, wherein there is no gap between the plurality of first touch channels, the plurality of second touch channels and the at least one cutting-side edge.

13. The touch substrate according to claim 11, wherein a first sub-touch channel in the plurality of first touch channels, which is arranged to be in parallel to and adjacent to the cutting-side edge, is a signal shielding channel, and/or a second sub-touch channel in the plurality of second touch channels, which is arranged to be in parallel to and adjacent to the cutting-side edge, is a signal shielding channel.

14. The touch substrate according to claim 13, wherein the signal shielding channel is connected to a ground pin or a floating pin of a touch IC via a flexible printed circuit.

15. A touch module, comprising: a touch substrate, wherein the touch substrate comprises a substrate, a plurality of first touch channels arranged to be extending in a first direction, and a plurality of second touch channels arranged to be extending in a second direction, wherein at least a part of the plurality of first touch channels and the plurality of second touch channels extends to at least one cutting-side edge of the substrate; and wherein the touch substrate includes a first cutting-side edge arranged to be extending in the first direction, wherein a first sub-touch channel in the plurality of first touch channels, which is arranged to be in parallel to and adjacent to the first cutting-side edge, extends to the first cutting-side edge, and the plurality of first touch channels are led out via touch lead wires located at two opposite sides of the touch substrate;

or wherein the touch substrate includes a second cutting-side edge arranged to be extending in the second direction, wherein a second sub-touch channel in the plurality of second touch channels, which is arranged to be in parallel to and adjacent to the second cutting-side edge, extends to the second cutting-side edge, and the plurality of first touch channels are led out via touch lead wires located at a side opposite to the second cutting-side edge on the touch substrate;

or wherein the touch substrate includes a first cutting-side edge arranged to be extending in the first direction, and a second cutting-side edge arranged to be extending in the second direction; wherein a first sub-touch channel in the plurality of first touch channels, which is arranged to be in parallel to and adjacent to the first cutting-side edge, extends to the first cutting-side edge, a second sub-touch channel in the plurality of second touch channels, which is arranged to be in parallel to and adjacent to the second cutting-side edge, extends to the second cutting-side edge, and the plurality of first touch channels are led out via touch lead wires located at a side opposite to the second cutting-side edge on the touch substrate.

16. The touch module according to claim 15, further including: a flexible printed circuit, and a touch IC in connection with the touch substrate by signals via the flexible printed circuit.

* * * * *